US007536542B2

(12) United States Patent  
Sheth et al.

(10) Patent No.: US 7,536,542 B2
(45) Date of Patent: May 19, 2009

(54) METHOD AND SYSTEM FOR INTERCEPTING, ANALYZING, AND MODIFYING INTERACTIONS BETWEEN A TRANSPORT CLIENT AND A TRANSPORT PROVIDER

(75) Inventors: Sachin C. Sheth, Bothell, WA (US); Shirish Koti, Redmond, WA (US); Vadim Eydelman, Redmond, WA (US); Nelamangala Krishnaswamy Srinivas, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 689 days.

(21) Appl. No.: 11/040,164

(22) Filed: Jan. 19, 2005

(65) Prior Publication Data
US 2006/0161981 A1 Jul. 20, 2006

(51) Int. Cl.
*H04L 9/00* (2006.01)
(52) U.S. Cl. .................................. 713/150; 709/250
(58) Field of Classification Search ................. 709/227, 709/245, 250, 203, 230, 236, 238; 713/150, 713/167; 726/11
See application file for complete search history.

(56) References Cited
U.S. PATENT DOCUMENTS

| 6,182,141 | B1 * | 1/2001 | Blum et al. ................. 709/227 |
| 7,167,926 | B1 * | 1/2007 | Boucher et al. ............. 709/250 |
| 2001/0023460 | A1 * | 9/2001 | Boucher et al. ............. 709/250 |
| 2003/0120811 | A1 * | 6/2003 | Hanson et al. .............. 709/245 |
| 2003/0233544 | A1 * | 12/2003 | Erlingsson ................. 713/167 |
| 2004/0030745 | A1 * | 2/2004 | Boucher et al. ............. 709/203 |
| 2004/0064578 | A1 * | 4/2004 | Boucher et al. ............. 709/236 |
| 2004/0078480 | A1 * | 4/2004 | Boucher et al. ............. 709/237 |
| 2004/0158640 | A1 * | 8/2004 | Philbrick et al. ............ 709/230 |
| 2005/0166040 | A1 * | 7/2005 | Walmsley .................. 713/150 |
| 2005/0204058 | A1 * | 9/2005 | Philbrick et al. ............ 709/238 |
| 2007/0226788 | A1 * | 9/2007 | Lee .............................. 726/11 |
| 2008/0046714 | A1 * | 2/2008 | Suganthi et al. ............. 713/150 |

OTHER PUBLICATIONS

Architecting the services optical network, Verma E L.Publication Date: Sep. 2001; Communication Magazine; vol. 39, issue:9, pp. 80-87.*
U.S. Appl. No. 11/231,352, filed Sep. 20, 2005, Sethi et al.
TDI Requests Versus Events, Network Devices and Protocols: Windows DDK, Copyright Microsoft Corporation 2004, Built on Nov. 23, 2004, Accessed Dec. 18, 2004 (1 page) http://msdn.microsoft.com/library/en-us/network/hh/network/303tdi_bcf6a688-0694-4767-ab3f-7a0ee1.

(Continued)

*Primary Examiner*—Kambiz Zand
*Assistant Examiner*—Monjour Rahim
(74) *Attorney, Agent, or Firm*—Perkins Coie LLP

(57) ABSTRACT

A method and system for intercepting communications between a transport client and a transport provider is provided. An interceptor system registers to intercept calls made by the transport client to functions of the transport provider. The interceptor system also replaces callbacks of the transport client so that calls from the transport provider intended for the transport client can be intercepted. When the interceptor system intercepts the call, it provides an indication of the call to a processing component. The processing component may analyze the call and determine whether the call should be allowed or denied. The interceptor system then proceeds to process the call in accordance with the indication of the processing component.

19 Claims, 14 Drawing Sheets

OTHER PUBLICATIONS

TDI Kernel-Mode Client Interactions, Network Devices and Protocols: Windows DDK, Copyright Microsoft Corporation, 2004, Built on Nov. 23, 2004, Accessed Dec. 18, 2004 (2 pages) http://msdn.microsoft.com/library/en-us/network/hh/network/303tdi__2288ad17-a27b-4c0f-9832-7d41e6.

TDI Transports and Their Clients, Network Devices and Protocols: Windows DDK, Copyright 2004 Microsoft Corporation, Built on Nov. 23, 2004, Accessed Dec. 18, 2004 (1 page) http://msdn.microsoft.com/library/en-us/netowrk/hh/network/303tdi__ffb2fd6d-d03a-4dec-95af-fb9116e1.

TDI File Objects, Network Devices and Protocols: Windows DDK, Copyright 2004 Microsoft Corporation, Built on Nov. 23, 2004, Accessed Dec. 18, 2004 (1 page) http://msdn.microsoft.com/library/en-us/network/hh/network/303tdi__c465flee-4a08-4350-9973-e5f325b.

Transport Driver Interface, Network Devices and Protocols: Windows DDK, Copyright Microsoft Corporation 2004, Built on Nov. 23, 2004, Accessed Dec. 18, 2004 (2 pages) http://msdn.microsoft.com/library/en-us/network/hh/network/303tdi__af260005-f147-404f-8883-d4b6328.

TDI Transports and Their Clients, Network Devices and Protocols: Windows DDK, Copyright 2004 Microsoft Corporation, Built on Sep. 2, 2004, Accessed Oct. 29, 2004 (1 page) http://msdn.microsoft.com/library/en-us/network/hh/network/303tdi__ffb2fd6d-d03a-4dec-95af-fb9116e1.

TDI Transport Driver Routines, Network Devices and Protocols: Windows DDK, Copyright Microsoft Corporation 2004, Built on Nov. 23, 2004, Accessed Dec. 18, 2004 (1 page) http://msdn.microsoft.com/library/en-us/network/hh/network/303tdi__e01afe79-e6eb-452c-abbd-4d1f4a2.

TDI Device Objects, Network Devices and Protocols: Windows DDK, Built on Nov. 23, 2004 (2 pages) Accessed Dec. 18, 2004 http://msdn.microsoft.com/library/en-us/network/hh/network/303tdi__bccb5f94-c589-4d2b-8579-1a0436.

* cited by examiner

| TDI-CO | |
|---|---|
| | Linkage |
| | AOLinkage |
| | pTDIClient CO |
| | pAssociatedAO |
| | pTargetDevice |
| | pConnectionContext |
| | pvFlowMgrCtxt |
| | PendingLocalIrps |
| | pTDIRecvBufferedList |
| | pTDISendBufferedList |
| | dwExtraBytesParsed |
| | dwLastAction |
| | RemoteAddress |
| | LocalAddress |

303

| TDI-AO | |
|---|---|
| | pNext |
| | pTDIClientAO |
| | PendingLocalIrps |
| | ao_connect |
| | ao_conncontext |
| | ... |
| | Protocol |
| | LocalAddress |
| | pOwningProcess |
| | pPIBContext |
| | AssociatedCOList |

302

| TDI-Buffer | |
|---|---|
| | pNext |
| | Owner |
| | pBuffer |
| | TotalSize |
| | Size |
| | Offset |
| | bDirection |

METHOD AND SYSTEM FOR INTERCEPTING, ANALYZING, AND MODIFYING INTERACTIONS BETWEEN A TRANSPORT CLIENT AND A TRANSPORT PROVIDER

TECHNICAL FIELD

The described technology relates generally to processing of communications between components of a transport mechanism.

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of software systems including application programs or other computer programs executing on those computer systems. Developers of software systems and administrators of computer systems of an enterprise go to great effort and expense to identify and remove vulnerabilities. Because of the complexity of software systems, however, it is virtually impossible to identify and remove all vulnerabilities before software systems are released. After a software system is released, developers can become aware of vulnerabilities in various ways. A party with no malicious intent may identify a vulnerability and may secretly notify the developer so the vulnerability can be removed before a hacker identifies and exploits it. If a hacker identifies a vulnerability first, the developer may not learn of the vulnerability until it is exploited—sometimes with disastrous consequences.

Regardless of how a developer finds out about a vulnerability, the developer typically develops and distributes to system administrators "patches" or updates to the software system that remove the vulnerability. If the vulnerability has not yet been exploited (e.g., might not be known to hackers), then a developer can design, implement, test, and distribute a patch in a disciplined way. If the vulnerability has already been widely exposed, then the developer may rush to distribute a patch without the same care that is used under normal circumstances. When patches are distributed to the administrators of the computer systems, they are responsible for scheduling and installing the patches to remove the vulnerabilities.

Unfortunately, administrators often delay the installation of patches to remove vulnerabilities for various reasons. When a patch is installed, the software system and possibly the computer system on which it is executing may need to be shut down and restarted. If the vulnerability is in a software system that is critical to the success of an enterprise, then the administrator needs to analyze the tradeoffs of keeping the software system up and running with its associated risk of being attacked and of shutting down a critical resource of the enterprise to install the patch. Some administrators may delay the installation of the patch because they fear that, because of a hasty distribution, it might not be properly tested and have unintended side effects. If the patch has an unintended side effect, then the software system, the computer system, or some other software component that is impacted by the patch may be shut down by the patch itself. Administrators need to factor in the possibility of an unintended side effect when deciding whether to install a patch. These administrators may delay installing a patch until experience by others indicates that there are no serious unintended side effects.

Intrusion detection systems have been developed that can be used to identify whether an attempt is being made to exploit a known vulnerability that has not yet been patched. These intrusion detection systems can be used to prevent exploitations of newly discovered vulnerabilities for which patches have not yet been developed or installed. These intrusion detection systems may define a "signature" for each way a vulnerability can be exploited. For example, if a vulnerability can be exploited by sending a certain type of message with a certain attribute, then the signature for that exploitation would specify that type and attribute. When a security enforcement event occurs, such as the receipt of a message, the intrusion detection system checks its signatures to determine whether any match the security enforcement event. If so, the intrusion detection system may take action to prevent the exploitation, such as dropping the message.

A set of one or more signatures may be considered a security policy. Developers of intrusion detection systems may provide various security policies. For example, a developer may provide one security policy that defines signatures of vulnerabilities of an operating system and many other security policies that are specific to an application or a class of applications. Similarly, an administrator may define a security policy that is specific to custom applications used by the enterprise.

Because intrusions can occur at various points within an operating system or an application, intrusion detection systems have been developed to detect and prevent exploitation of vulnerabilities at each of these points. For example, an intrusion detection system may prevent exploitation of vulnerabilities that can be detected at the transport layer of a communication protocol. This intrusion detection system needs to intercept communications between a transport layer and a higher layer and determine whether the communications are an attempt to exploit a vulnerability.

Many implementations of transport layers adhere to the Transport Device Interface ("TDI") of Microsoft Corporation. TDI defines the interactions between a "transport provider" that implements the transport layer and a "transport client" that uses the services of the transport provider. One example of a transport provider is a TCP driver, and one example of a transport client is a redirector of a file system. The redirector invokes functions provided by the TCP driver to send and receive messages via TCP. FIG. 1 is a block diagram illustrating interactions between a TDI transport client and a TDI transport provider. In this example, the transport provider and transport client both execute in kernel mode. The transport client 102 may request services of the transport provider 101 through I/O manager 103. The I/O manager may provide high-level function calls to the transport client and map those high-level function calls to function calls of the transport provider. For example, when the transport client performs function call 110, the I/O manager maps it to function call 111. The functions of the transport provider may be asynchronous in that a function returns before the requested service is completed. Thus, when a function call is made, the transport client provides a completion routine through which the transport provider can asynchronously notify the transport client when the service requested by the function call has been completed by invoking the completion routine 112. If the function call was made via the I/O manager, then the I/O manager invokes the completion routine 113 of the transport client. A transport client may also invoke the functions of the transport provider directly 114. The transport client may also register with the transport provider to be notified of certain events asynchronously. For example, the transport client may want to be notified when a packet is received. The transport client may register a callback for each type of event. When the transport provider detects an event for which the transport client has registered a callback, the transport provider calls the corresponding registered callback 116 to provide event-based notification to the transport client.

Developers of intrusion detection systems may develop many different ways to enforce security policies and at various levels of a communications protocol. It would be desirable to have an effective way to intercept communications at the transport layer and enforce security policies.

SUMMARY

A method and system for intercepting communications between a transport client and a transport provider is provided. An interceptor system registers to intercept calls made by the transport client to functions of the transport provider. The interceptor system also replaces callbacks of the transport client so that calls from the transport provider intended for the transport client can be intercepted. When the interceptor system intercepts the call, it provides an indication of the call to a processing component. The processing component may analyze the call and determine the action to be taken (e.g., allow or deny the call). The interceptor system then proceeds to process the call in accordance with the indicated action of the processing component.

BRIEF DESCRIPTION OF THE DRAWINGS

FIG. 3 is a block diagram that illustrates data structures of the interceptor system in one embodiment.

DETAILED DESCRIPTION

Figure 1:
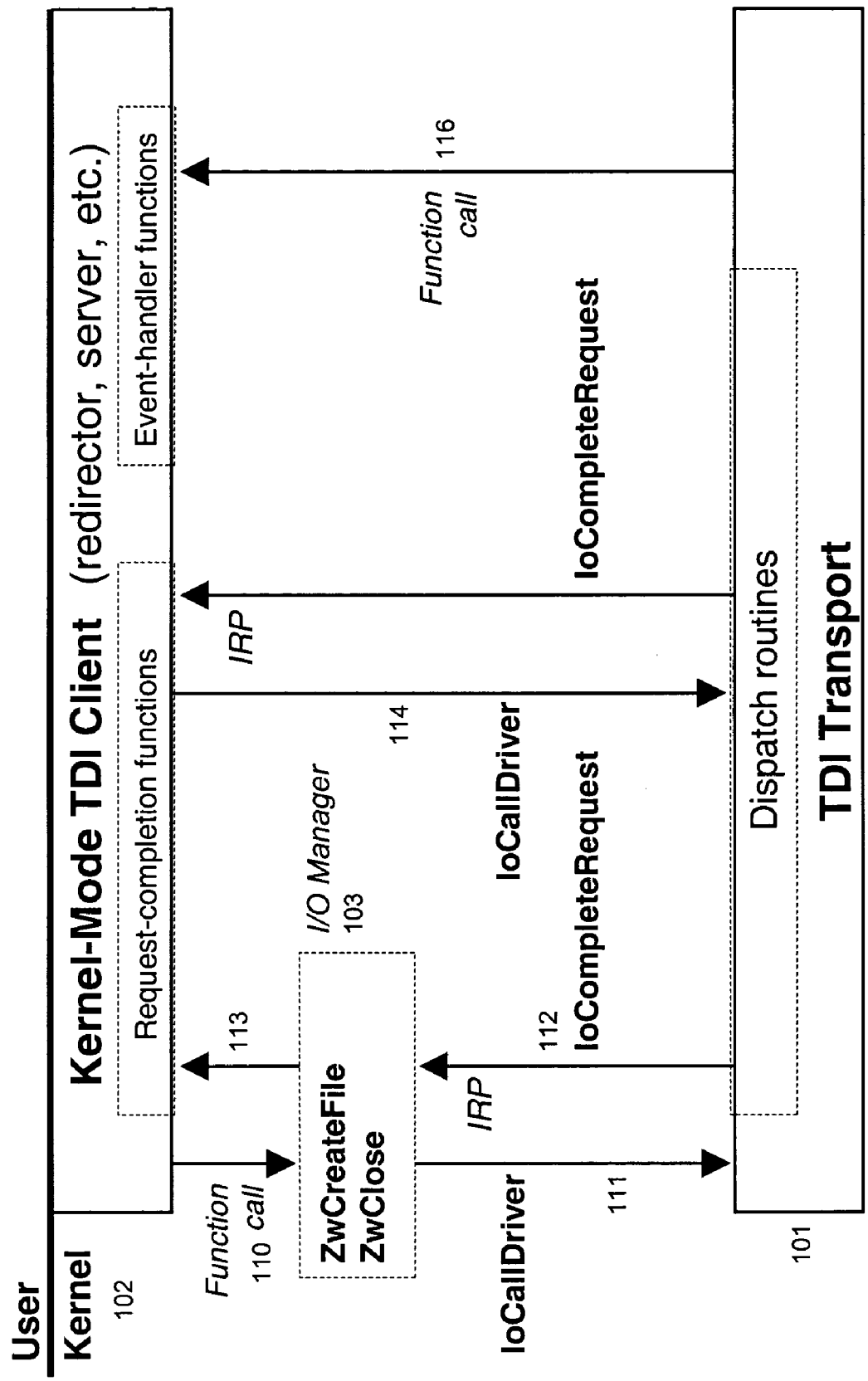
FIG. 1 is a block diagram illustrating interactions between a transport client and a transport provider.

A method and system for intercepting communications between a transport client and a transport provider is provided. In one embodiment, an interceptor system registers to intercept calls made by the transport client to functions of the transport provider. The interceptor system also replaces callbacks of the transport client so that calls from the transport provider intended for the transport client can be intercepted. When the interceptor system intercepts the call, it provides an indication of the call to a processing component. The processing component may, for example, enforce security policies. Techniques for enforcing security policies are described in U.S. patent application Ser. No. 10/993,688, filed on Nov. 19, 2004 and entitled "Method and System for Distributing Security Policies," which is hereby incorporated by reference. The processing component may analyze the call and determine what action should be taken such as whether the call should be allowed or denied. For example, if the processing component detects that the call might be an attempt to exploit a vulnerability, then the processing component would provide an indication that the call should be denied. The interceptor system then proceeds to process the call in accordance with the indication of the processing component. In this way, the interceptor system provides a uniform way to intercept calls between a transport client and the transport provider and notifies a processing component for deciding how to handle the intercepted call.

In one embodiment, the interceptor system intercepts calls between a transport provider and a transport client that adhere to the Transport Device Interface ("TDI") of Microsoft Corporation. One skilled in the art will appreciate that a "call" is just one type of interaction or communication that can be intercepted. As such, a transport provider is referred to as a "TDI provider," and a transfer client is referred to as a "TDI client." To ensure that the interceptor system can intercept all calls between a TDI client and a TDI provider, the interceptor component is launched before the TDI provider is launched. The interceptor system initially registers to receive notification of when the TDI provider is launched. When the interceptor system receives the notification that the TDI provider has been launched, the interceptor system registers to hook all calls to the TDI provider. The TDI client then can be launched and start calling functions of the TDI provider. This ordering of launching the interceptor system, the TDI provider, and a TDI client, along with the registration to receive notifications and hooking of calls, helps ensure that the interceptor system will intercept all calls between the TDI client and the TDI provider.

In one embodiment, when the interceptor system intercepts a call by a TDI client to a function of a TDI provider, it notifies the processing component. The processing component may indicate to allow or deny the call. If the call is allowed, the interceptor system places an interceptor completion routine prior to the completion routine in the call. The interceptor system then calls the corresponding function of the TDI provider. When the function returns, it returns to the interceptor component, which may notify the processing component and return to the TDI client. When the function is asynchronously completed, the TDI provider invokes the interceptor completion routine. The interceptor completion routine may notify the processing component, which may indicate to allow or deny the invoking of the completion routine of the TDI client. If it is allowed, the interceptor system invokes the completion routine of the TDI client to provide asynchronous notification of completion of the function.

In one embodiment, when the interceptor system intercepts a call by the TDI client to register client event callbacks with the TDI provider, the interceptor system replaces the client event callbacks with interceptor event callbacks. The interceptor system records the client event callbacks and then registers the interceptor event callbacks with the TDI provider. When a corresponding event occurs, the TDI provider calls the interceptor event callback, which passes control to the interceptor system. The interceptor system can then notify the processing component and can call the corresponding client event callback as indicated by the processing component. The replacing of callbacks allows the interceptor system to intercept event notifications from the TDI provider to the TDI client.

In one embodiment, the processing component may be a flow manager that monitors the flow of communications at various levels of a communications protocol stack and enforces a security policy. The flow manager may define a flow for each connection at a certain level. For example, if the flow manager receives communications between a transport layer that implements TCP and a higher layer, then the flow manager may define a flow for each TCP connection. A flow manager is described in U.S. patent application Ser. No. 11/039,654, filed concurrently and entitled "Method and System for Securing a Remote File System," which is hereby incorporated by reference. The flow manager is notified of communications between the transport layer and a higher layer and then applies the rules of the security policy to the communications to determine whether to allow or deny the communications.

Figure 2:
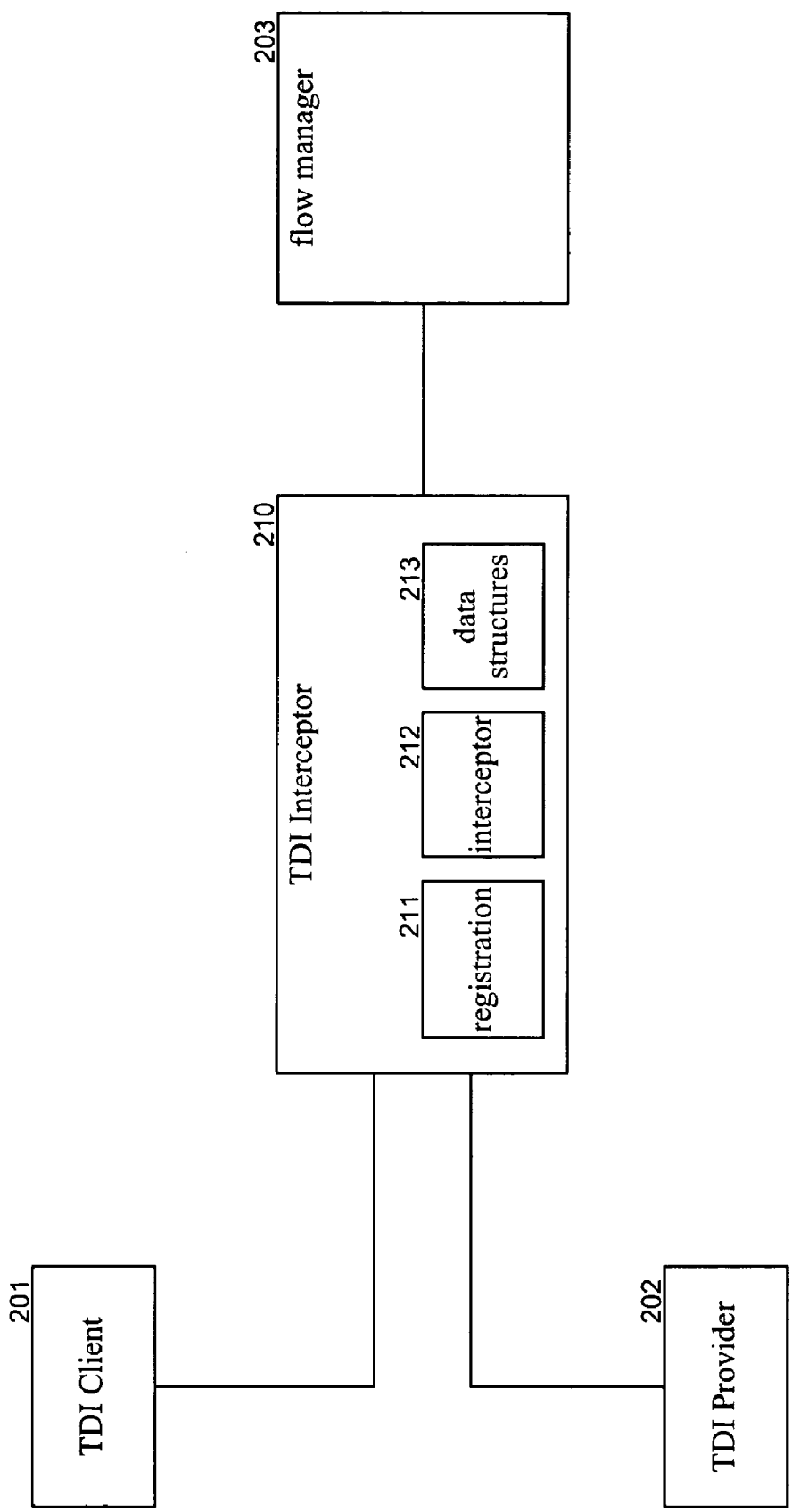
FIG. 2 is a block diagram illustrating the relationship between a transport client, a transport provider, and the interceptor system in one embodiment.

FIG. 2 is a block diagram illustrating the relationship between a transport client, a transport provider, and the interceptor system in one embodiment. The TDI interceptor system 210 intercepts communications between a TDI client 201 and a TDI provider 202. The TDI interceptor system provides indications of the communications to the flow manager component 203, which decides whether to allow or deny the communications based on a security policy relating to the transport layer. The TDI interceptor system includes a registration component 211, an interceptor component 212, and data structures 213. The registration component coordinates the registration of the TDI interceptor system to intercept communications from the TDI client to the TDI provider. The interceptor component processes the intercepted communications, enables the intercepting of callbacks, notifies the flow manager component of intercepted communications, and allows or denies the communications based on indications provided by the flow manager component. The TDI interceptor system maintains data structures to track endpoint addresses, various connections with an endpoint, and buffered data. An endpoint is a source or destination of a communication. Many different connections can be established to the same endpoint. Thus, there is a one-to-many relationship between an endpoint and connections.

The computing device on which the interceptor system is implemented may include a central processing unit, memory, input devices (e.g., keyboard and pointing devices), output devices (e.g., display devices), and storage devices (e.g., disk drives). The memory and storage devices are computer-readable media that may contain instructions that implement the interceptor system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

The interceptor system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The host computer systems may be cell phones, personal digital assistants, smart phones, personal computers, programmable consumer electronics, digital cameras, and so on.

The interceptor system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 3 is a block diagram that illustrates data structures of the interceptor system in one embodiment. The interceptor system includes a TDI buffer data structure 301, a TDI address object data structure 302, and a TDI connection object data structure 303. The interceptor system uses the TDI buffer data structure for two purposes: to package intercepted data for interpretation by the processing component and to buffer data sent between the TDI client and TDI provider as requested by the flow manager. The TDI buffer provides an abstraction of the intercepted data to facilitate the design of the processing component. The flow manager may request the buffering for various reasons. For example, a rule of the security policy may indicate that a certain sequence of packets is an attempt to exploit a vulnerability. The flow manager may ask the interceptor system to buffer the packets so that the flow manager can apply the rule to the sequences of packets, rather than having to buffer the packets itself. The interceptor system uses the TDI address object data structure to track information of each endpoint. The interceptor component uses the TDI connection object data structure to track information about each connection to each endpoint. The TDI address object and TDI connection object data structures correspond to various file objects maintained by the TDI client. Tables 1-3 describe fields of the TDI buffer data structure, the TDI address object data structure, and the TDI connection object data structure, respectively, in one embodiment. The interceptor system stores these data structures in hash tables using chaining to link together colliding entries. The ellipses of Table 2 indicates that the table contains a pair of entries for each event for which the TDI has registered a callback. The first entry of the pair identifies the callback, and the second entry identifies context that is provided when the callback is invoked.

TABLE 1

(TDI-Buffer)

| Field | Description |
| --- | --- |
| struct_TDIBBuf *pNext | Next buffer in colliding chain |
| UINT Owner | Owner of buffer |
| UCHAR *pBuffer | Pointer to actual data |
| UINT TotalSize | Size of data in bytes starting at pBuffer |
| UINT Size | Size of data in bytes starting at Offset |

TABLE 1-continued (TDI-Buffer)

| Field | Description |
| --- | --- |
| UINT Offset | Offset to latest data |
| BYTE bDirection | Direction of data flow |

TABLE 2

(TDI-AO)

| Field | Description |
| --- | --- |
| LIST_ENTRY Linkage | Link to next address object in colliding chain |
| PFILE_OBJECT pTDIClientAO | Pointer to Address Object created by TDI Client |
| LIST_ENTRY PendingLocalIrps | List of locally generated IRPs |
| PTDI_IND_CONNECT ao_connect | Connect event handler of TDI client for pTDIClientAO |
| PVOID ao_conncontext | Connect event context of TDI client for pTDIClientAO |
| . | . |
| . | . |
| . | . |
| PP_PROTOCOL_TYPE Protocol | Type of Protocol |
| TDI_ADDRESS_IP LocalAddress | Local Address |
| PEPROCESS pOwningProcess | Process Identifier |
| PVOID pPIDContext | Pointer to Process Context |
| LIST_ENTRY AssociatedCOList | List of Connection Objects associated with this Address Object |

TABLE 3

(TDI-CO)

| Field | Description |
| --- | --- |
| LIST_ENTRY Linkage | Link to next Connection Object in colliding chain |
| LIST_ENTRY AOLinkage | Link to next Connection Object for the associated Address Object |
| PFILE_OBJECT pTDIClientCO | Pointer to Connection Object created by TDI Client |
| PTDIB_AO pAssociatedAO | Pointer to associated Address Object |
| PDEVICE_OBJECT pTargetDevice | Pointer to the next device object |
| CONNECTION_CONTEXT pConnectionContext | Context |
| PVOID pvFlowMgrCtxt | Pointer to Flow Manager context |
| LIST_ENTRY PendingLocalIrps | List of IRPs created locally |
| PTDIBBuf pTDIRecvBufferedList | List of Received Data |
| PTDIBBuf pTDISendBufferedList | List of Send Data |
| DWORD dwExtraBytesParsed | Number of bytes that were parsed in excess by the Flow Manager on this connection |
| DWORD dwLastAction | Action taken on last data that was processed |
| TDI_ADDRESS_IP RemoteAddress | Address of remote endpoint |
| TDI_ADDRESS_IP LocalAddress | Address of local endpoint |

Figure 4:
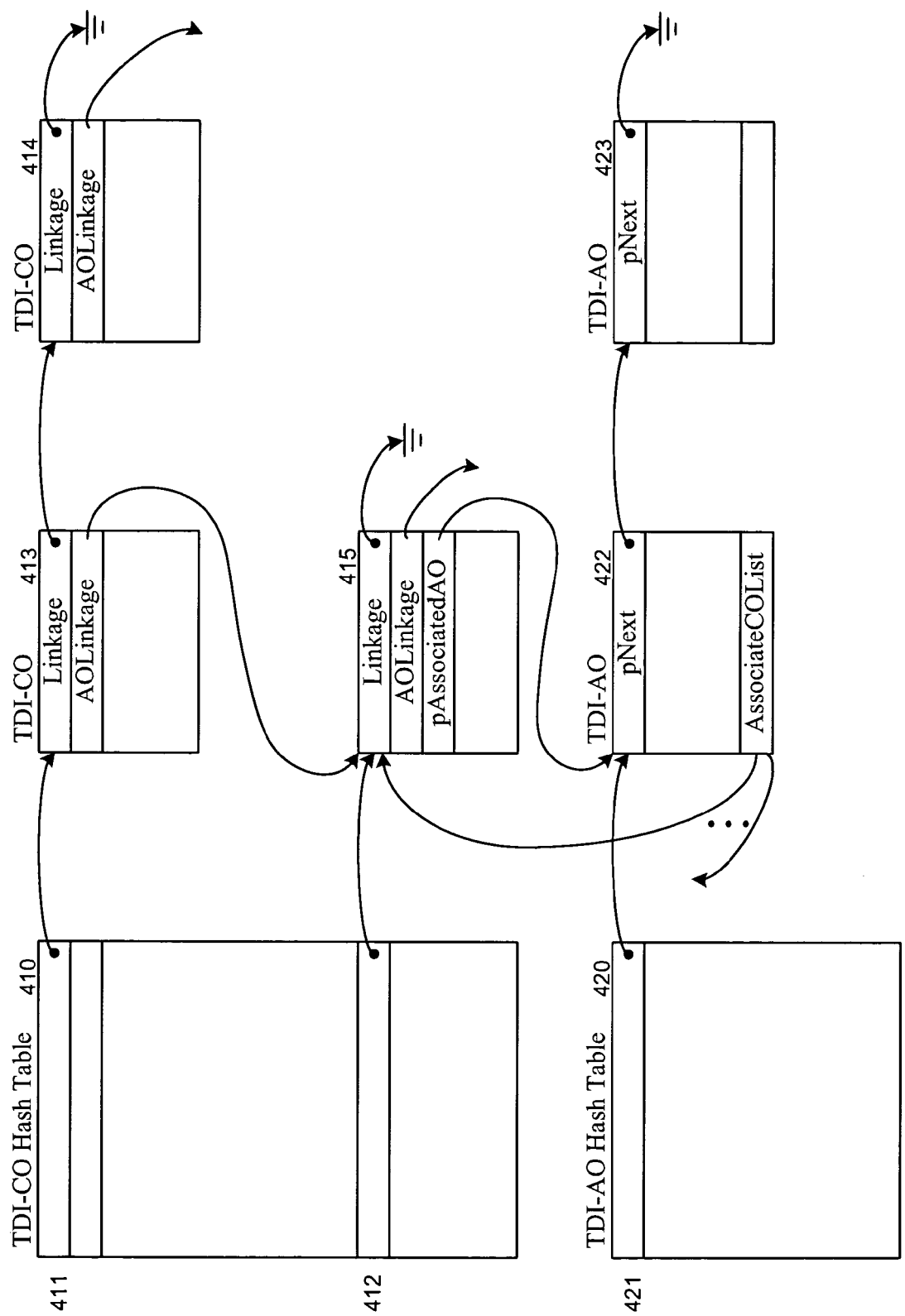
FIG. 4 is a block diagram that illustrates hash tables of the interceptor system in one embodiment.

FIG. 4 is a block diagram that illustrates hash tables of the interceptor system in one embodiment. The interceptor system maintains the TDI connection object hash table 410 and the TDI address object hash table 420. The interceptor system maintains a unique pair of hash tables for each transport type and each transport version. Entry 411 of the TDI connection object hash table contains a pointer to the TDI connection object data structure 413, which contains a link to a colliding TDI connection object data structure 414. Entry 412 contains a pointer to the TDI connection object data structure 415. Entry 421 of the TDI address object hash table contains a pointer to the TDI address object data structure 422. The TDI address object data structure contains a pointer to the colliding TDI address object data structure 423. The TDI address object data structure contains a pointer to each TDI connection object data structure associated with the TDI address object data structure. The TDI connection object data structures form a link list of the TDI connection object data structures associated with the same TDI address object data structure. One skilled in the art will appreciate that many different types of data structures and data organizations may be used to maintain information relating to buffering, endpoint addresses, and connections. One skilled in the art will appreciate that the data structures and data organization of FIG. 4 are merely illustrative of one embodiment.

Figure 5:
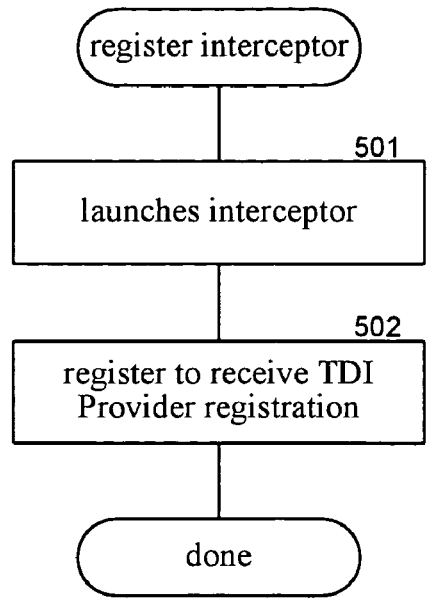
FIG. 5 is a flow diagram that illustrates the registration of the interceptor component in one embodiment.
Figure 6:
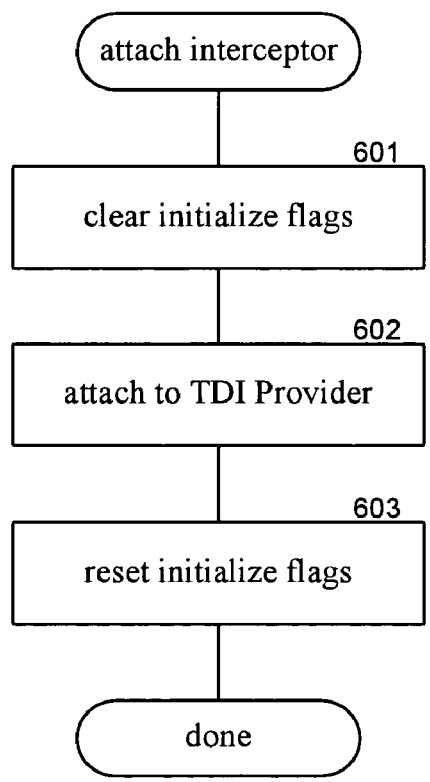
FIG. 6 is a flow diagram that illustrates attaching of the interceptor component after the TDI provider has been launched in one embodiment.

FIGS. 5 and 6 illustrate the registration by the interceptor system to intercept communications between a TDI client and a TDI provider in one embodiment. FIG. 5 is a flow diagram that illustrates the registration of an interceptor component in one embodiment. In block 501, the component launches the interceptor component. In block 502, the component registers to receive a notification that the TDI provider has been launched. The component then completes. FIG. 6 is a flow diagram that illustrates attaching of the interceptor component after the TDI provider has been launched in one embodiment. In block 601, the component saves any initialization flags associated with the transport provider due to implementation issues. In block 602, the component attaches the interceptor component to the TDI provider to hook all calls to the TDI provider. In block 603, the component restores the initialization flags for the transport provider and then completes.

Figure 7:
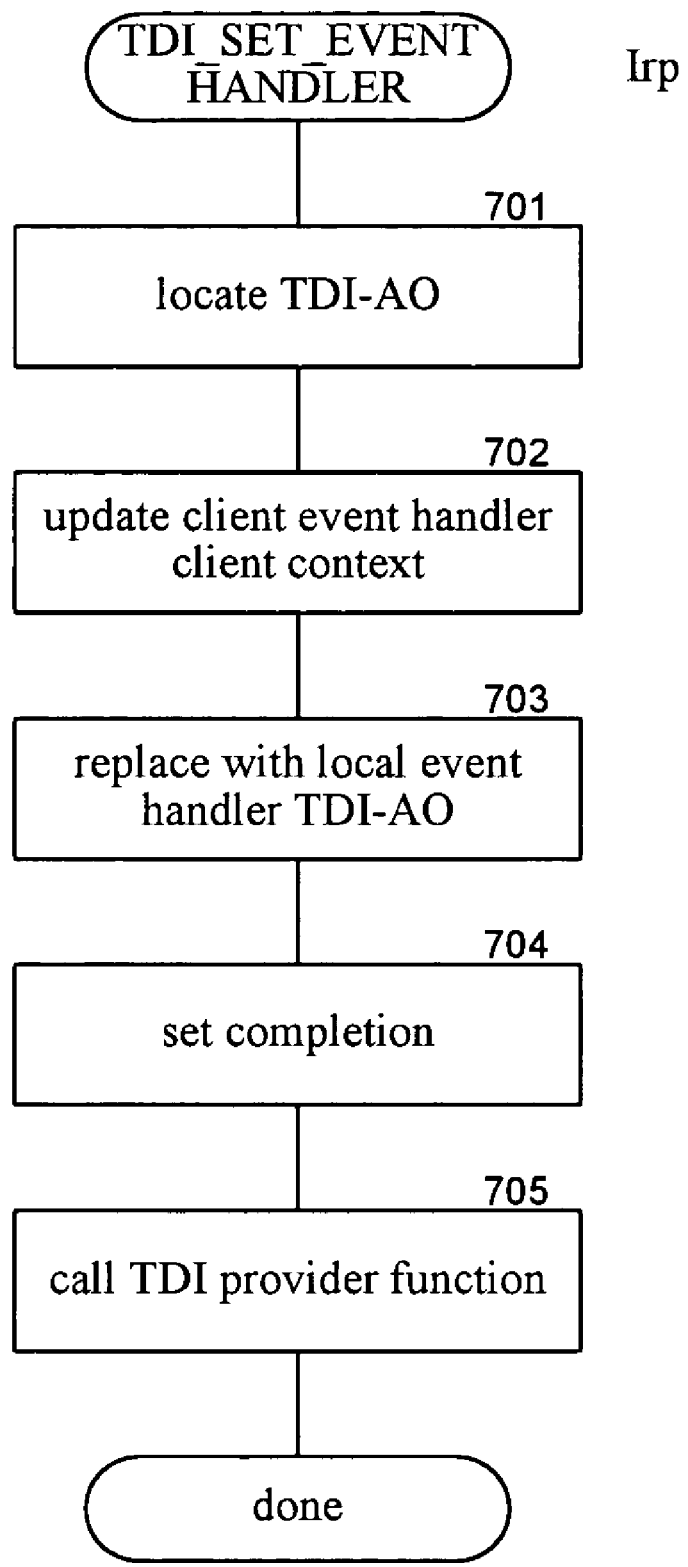
FIG. 7 is a flow diagram that illustrates processing when a TDI client registers an event handler in one embodiment.

FIGS. 7-17 are flow diagrams that illustrate the intercepting of calls between a TDI client and a TDI provider in one embodiment. FIG. 7 is a flow diagram that illustrates processing when a TDI client registers an event handler in one embodiment. The TDI client registers an event handler by invoking a function of the TDI provider. The TDI client passes an I/O request packet ("IRP") along with an indication of the client callback for the event. In block 701, the component locates the TDI address object data structure corresponding to the endpoint indicated by the IRP. In block 702, the component updates the client event handler and the client context field of the TDI address object data structure for the event. In block 703, the component replaces the client event handler and the client context information of the function call with an interceptor handler and an interceptor context. In block 704, the component sets the completion routine for providing asynchronous notification of completion of the service requested by the TDI client. The component sets the completion routine by saving the client completion routine and then replaces it with an interceptor completion routine. In block 705, the component invokes a corresponding function of the TDI provider passing the IRP. The component then completes.

Figure 8:
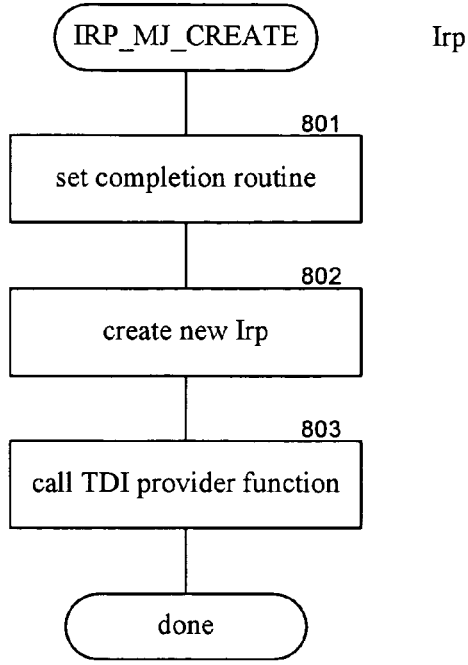
FIG. 8 is a flow diagram that illustrates the synchronous component that creates a file object in one embodiment.
Figure 9:
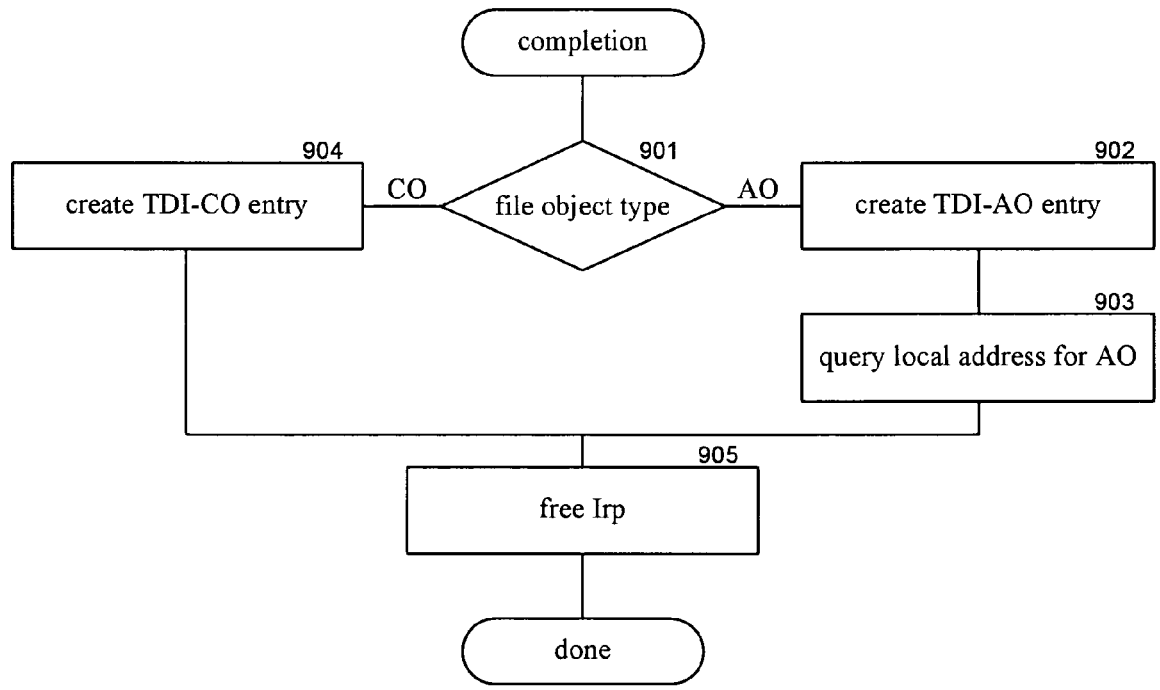
FIG. 9 is a flow diagram that illustrates the asynchronous component that creates a file object in one embodiment.

FIGS. 8-9 are flow diagrams that illustrate the processing of a request by a TDI client to create a file object in one embodiment. A file object may correspond to an address of an endpoint, a connection to an endpoint, or a central channel. Only address and connection endpoints are described below. One skilled in the art will appreciate that control channels can be implemented in a similar manner. FIG. 8 is a flow diagram that illustrates the synchronous component that creates a file object in one embodiment. The component is passed an IRP. In block 801, the component sets the completion routine. In block 802, the component creates a new IRP if required. In block 803, the component invokes the corresponding function of the TDI provider and then completes. FIG. 9 is a flow diagram that illustrates the asynchronous component that creates a file object in one embodiment. In decision block 901, if the object is an address object, then the component continues at block 902, else the object is a connection object and the component continues at block 904. In block 902, the component creates a TDI address object entry within the hash table. The component stores the identification of the process that creates the address object along with process information. Any further operations on the address object and its connection objects are considered to be generated by the identified process. In block 903, the component queries for local address information for the TDI address object. In block 904, the component creates a TDI connection object entry for the hash table. In block 905, the component frees the IRP if a new one was created in block 802. The component then completes.

Figure 10:
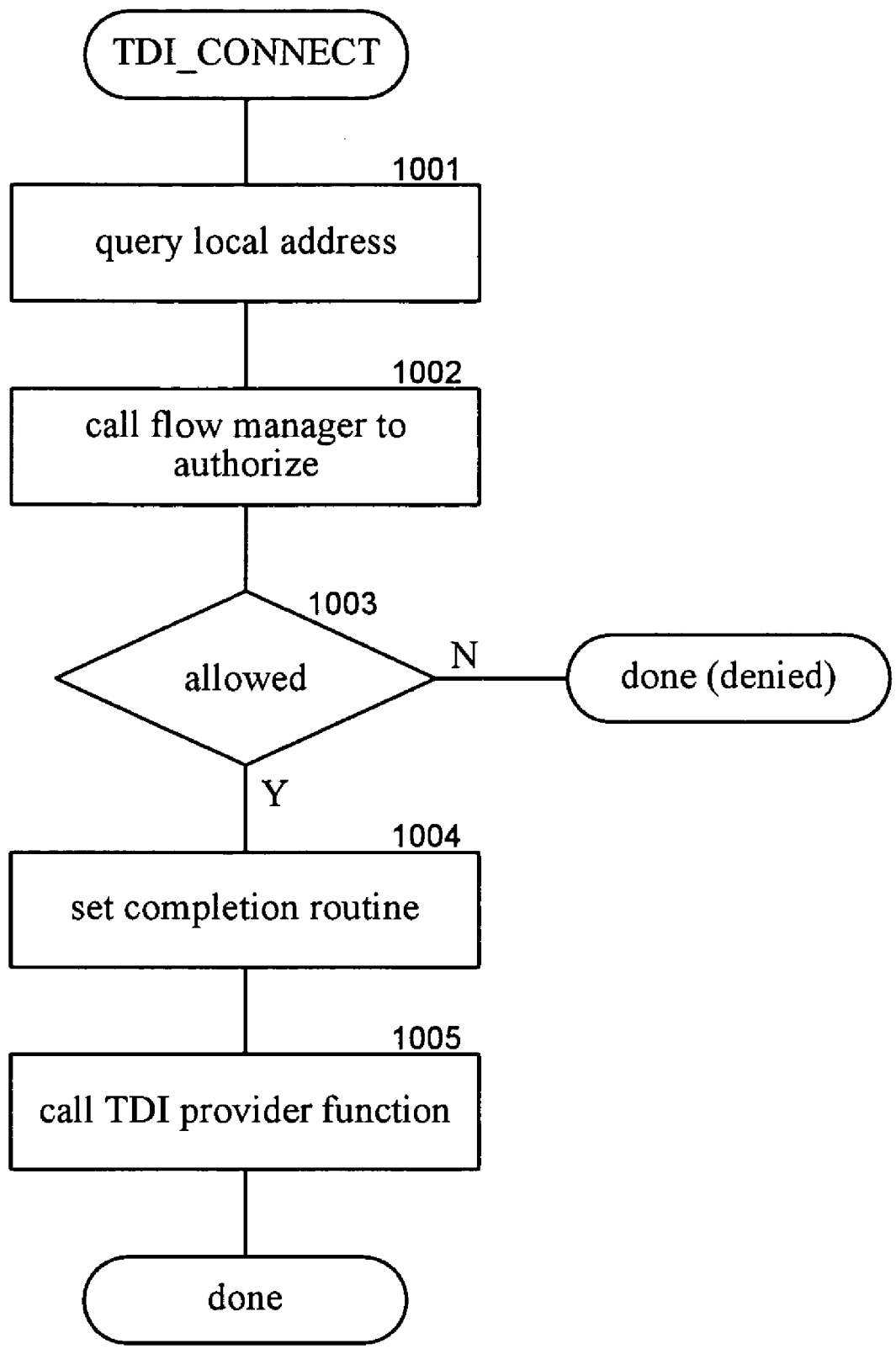
FIG. 10 is a flow diagram that illustrates the processing of the synchronous component of connecting to an endpoint in one embodiment.
Figure 11:
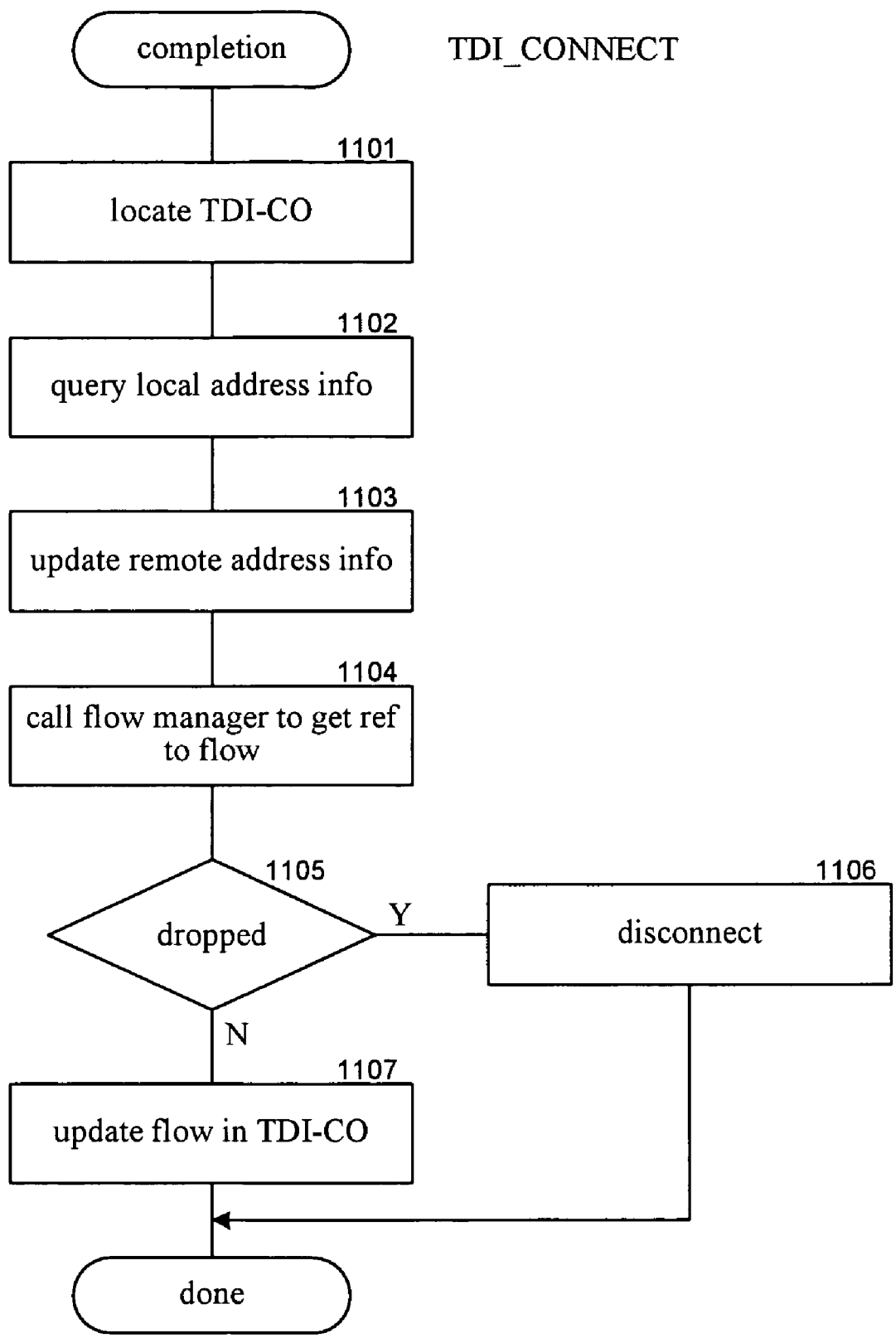
FIG. 11 is a flow diagram that illustrates the processing of the asynchronous component of connecting to an endpoint in one embodiment.

FIGS. 10-11 are flow diagrams that illustrate the processing of a request by a TDI client to connect an endpoint in one embodiment. FIG. 10 is a flow diagram that illustrates the processing of the synchronous component of connecting to an endpoint in one embodiment. The component is passed an IRP. In block 1001, the component queries for local address information of the endpoint. In block 1002, the component calls the flow manager, which decides whether to allow or deny the request of the IRP. In decision block 1003, if the request is allowed, then the component continues at block 1004, else the component returns an indication of denied to the TDI client. In block 1004, the component sets the completion routine. In block 1005, the component calls the corresponding TDI provider function. The component then completes. FIG. 11 is a flow diagram that illustrates the processing of the asynchronous component of connecting to an endpoint in one embodiment. In block 1101, the component locates the TDI connection object for the new connection. In block 1102, the component queries for local address information. In block 1103, the component updates remote address information. In block 1104, the component invokes the flow manager to get a reference to the flow associated with the connection. In decision block 1105, if the flow manager indicates to drop the connection, then the component continues at block 1106, else the component continues at block 1107. In block 1106, the component disconnects the connection and then completes. In block 1107, the component updates the flow information in the located TDI connection object data structure and then completes.

Figure 12:
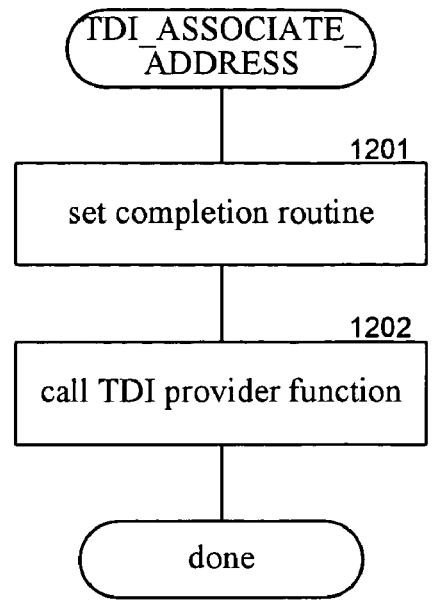
FIG. 12 is a flow diagram that illustrates the processing of the synchronous component of the associating in one embodiment.
Figure 13:
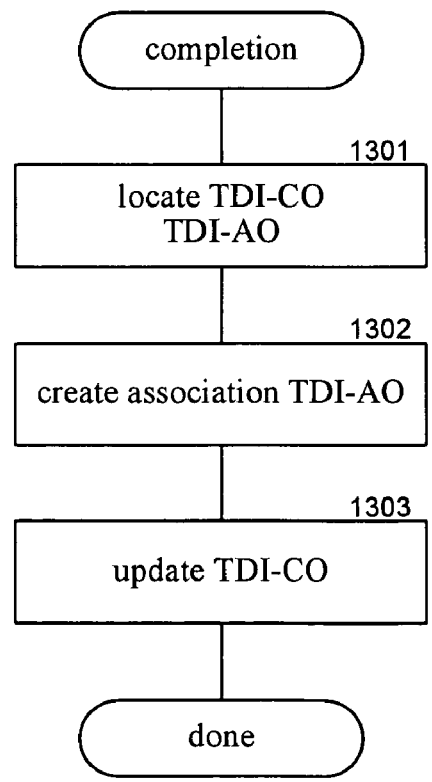
FIG. 13 is a flow diagram that illustrates the processing of the asynchronous component of the associating in one embodiment.

FIGS. 12 and 13 are flow diagrams that illustrate the processing of associating a new connection with an endpoint in one embodiment. FIG. 12 is a flow diagram that illustrates the processing of the synchronous component of the associating in one embodiment. The component is passed an IRP. In block 1201, the component sets the completion routine. In block 1202, the component calls the corresponding TDI provider function. The component then completes. FIG. 13 is a flow diagram that illustrates the processing of the asynchronous component of the associating in one embodiment. In block 1301, the component locates the TDI connection object data structure and the TDI address object data structure. In block 1302, the component creates an association between the TDI address object data structure and the TDI connection object data structure. In block 1303, the component updates the TDI connection object data structures and completes.

Figure 14:
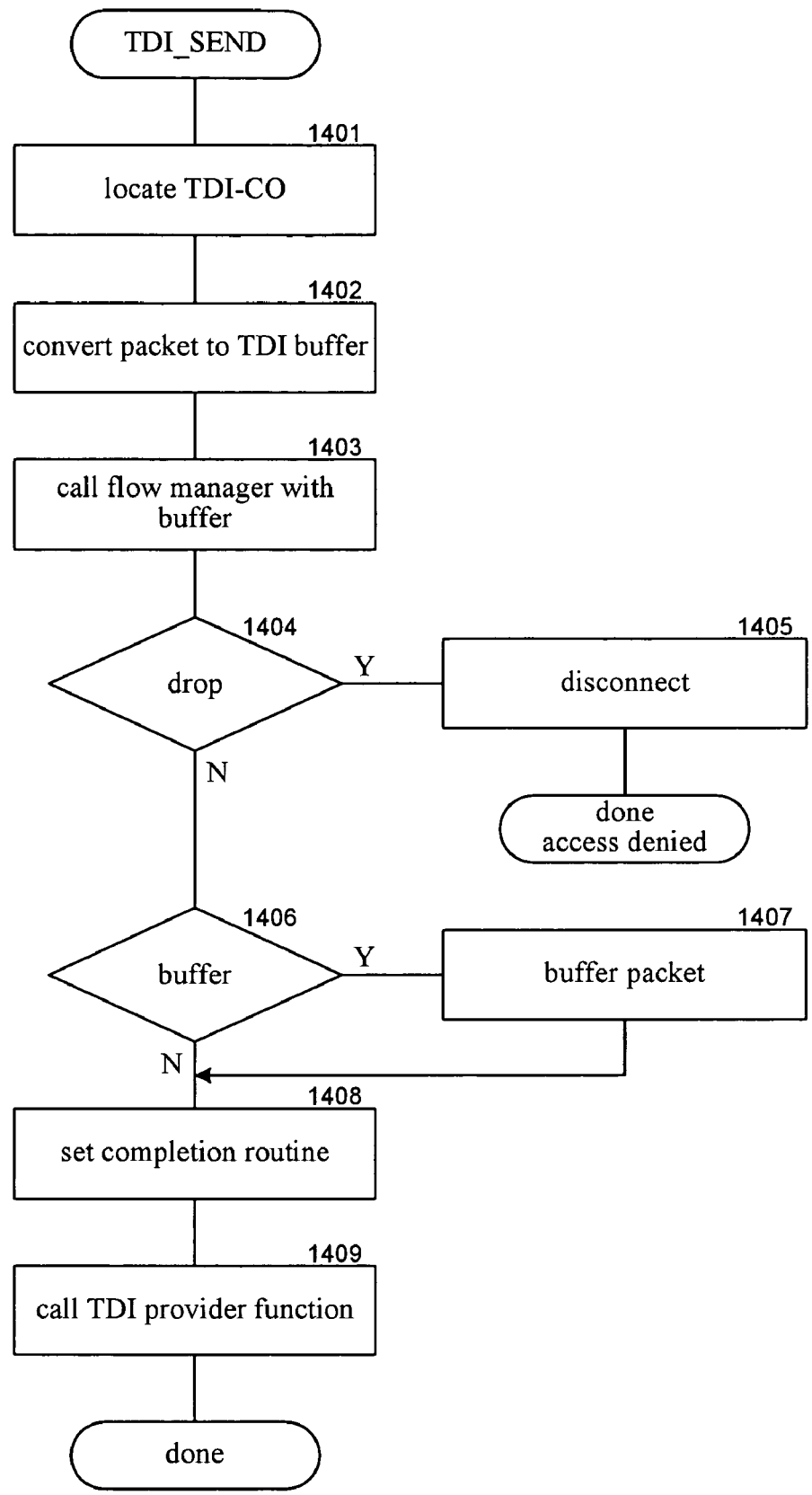
FIG. 14 is a flow diagram that illustrates the processing of the synchronous component of a send request in one embodiment.

FIG. 14 is a flow diagram that illustrates the processing of the synchronous component of a send request in one embodiment. The component is invoked by a TDI client to send data across a connection. The component is passed an IRP. In block 1401, the component locates the TDI connection object data structure associated with the IRP. In block 1402, the component converts the packet of the IRP to a TDI buffer data structure. In block 1403, the component calls the flow manager with the TDI buffer data structure and any other buffered data structures. In decision block 1404, if the flow manager indicates to drop the connection, then the component disconnects the connection in block 1405 and then completes with an indication that access has been denied, else the component continues at block 1406. In decision block 1406, if the flow manager indicates to buffer the packet, then the component continues at block 1407, else the component continues at block 1408. In block 1407, the component adds the newly created TDI buffer data structure to the buffer hash table. In block 1408, the component sets the completion routine. In block 1409, the component invokes the corresponding function of the TDI provider. The component then completes.

Figure 15:
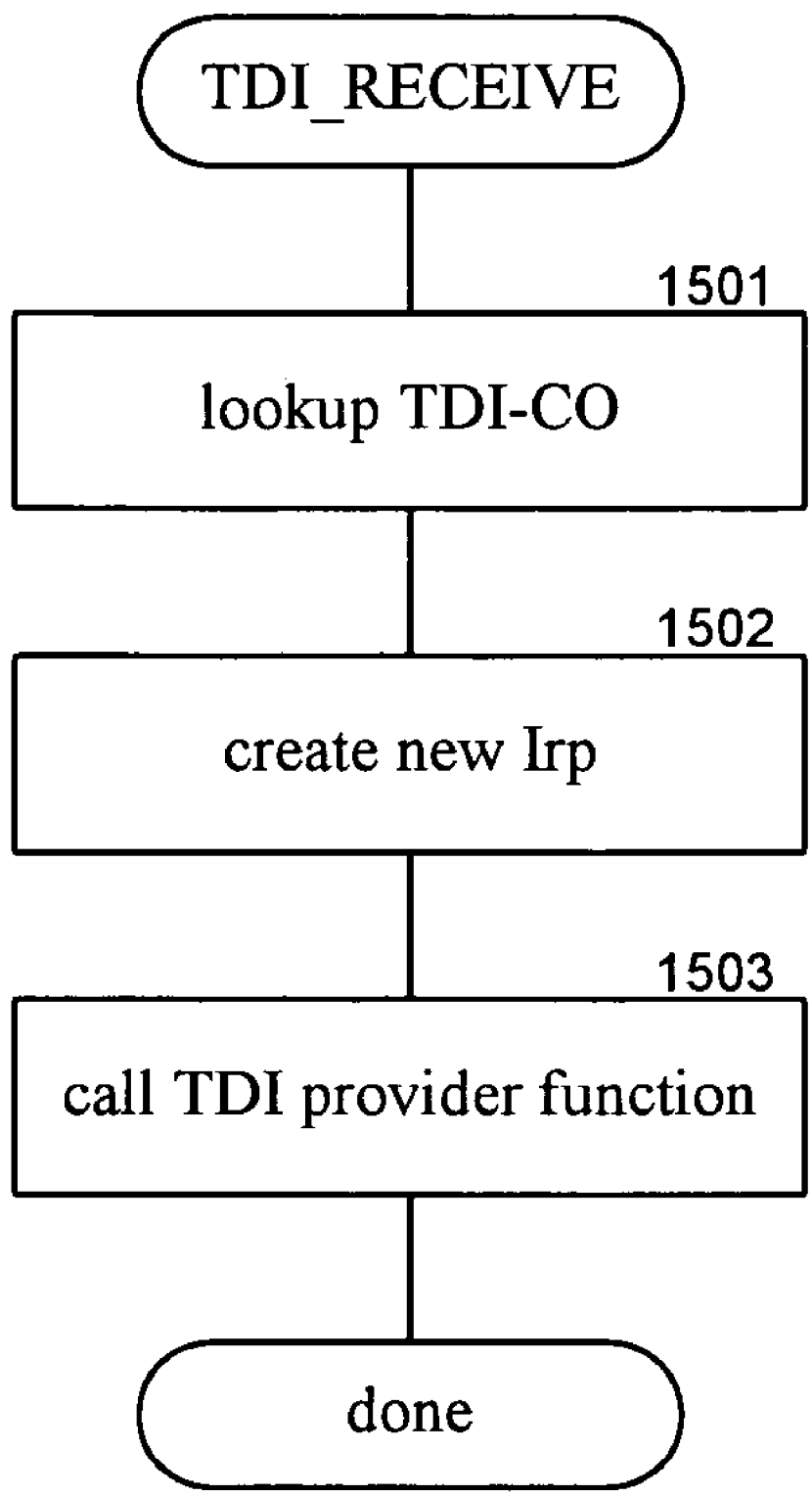
FIG. 15 is a flow diagram that illustrates the synchronous component of the receive function in one embodiment.
Figure 16:
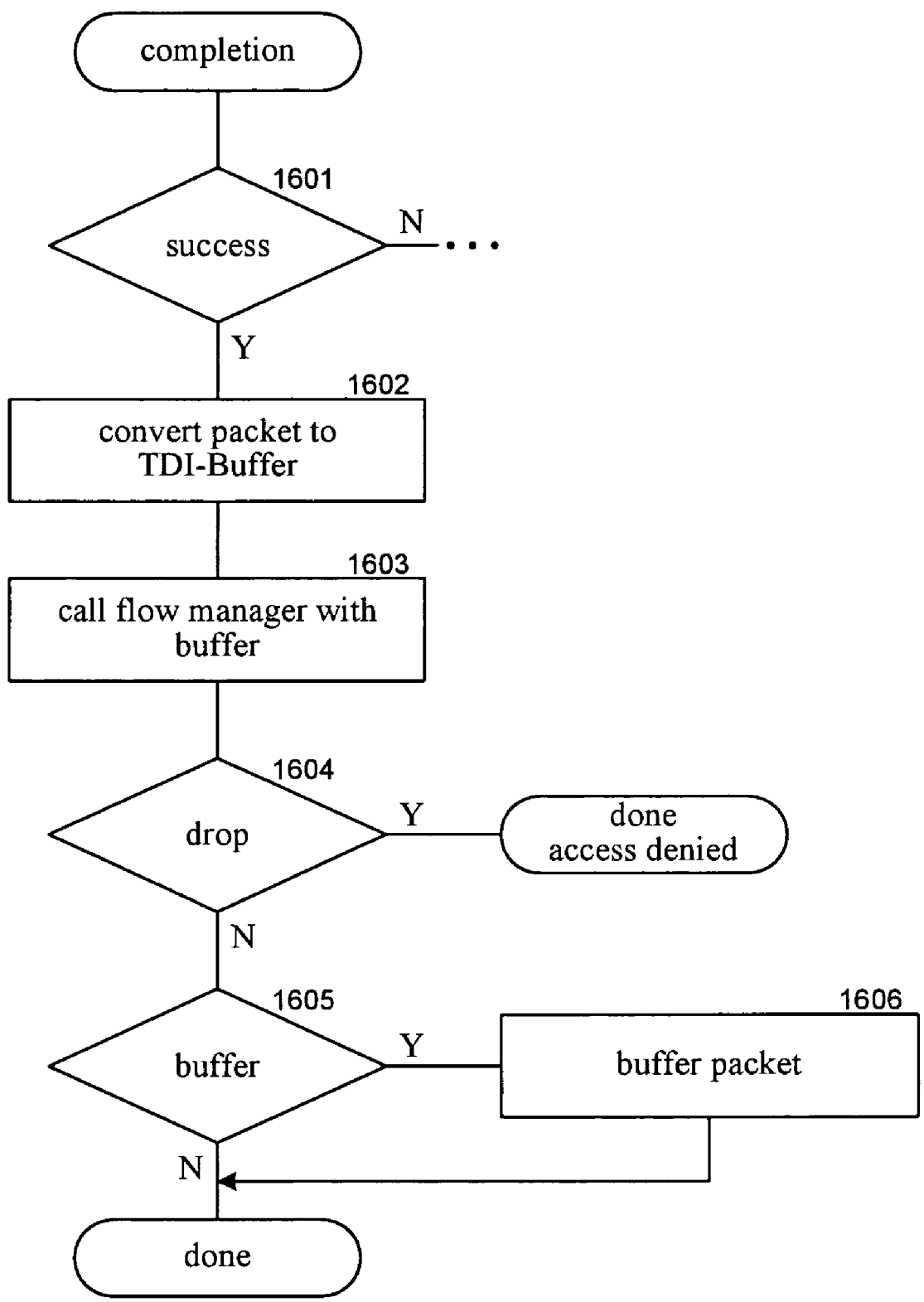
FIG. 16 is a flow diagram that illustrates the asynchronous component of the receive function in one embodiment.

FIGS. 15-16 are flow diagrams that illustrate the processing of a request by a TDI client to receive a packet in one embodiment. FIG. 15 is a flow diagram that illustrates the synchronous component of the receive function in one embodiment. The component is passed an IRP. In block 1501, the component locates the TDI connection object data structure corresponding to the IRP. In block 1502, the component creates a new IRP. In block 1503, the component calls the corresponding function of the TDI provider and then completes. FIG. 16 is a flow diagram that illustrates the asynchronous component of the receive function in one embodiment. In decision block 1601, if the processing of the receive function was successful, then the component continues at block 1602, else the component reports an error message. In block 1602, the component converts the packet to the TDI buffer data structure. In block 1603, the component calls the flow manager with buffer data structures. In decision block 1604, if the flow manager indicates to drop the packet, then the component completes indicating that access is denied, else the component continues at block 1605. In decision block 1605, if the flow manager indicates to buffer the packet, then the component buffers the packet in block 1606. The component then completes.

Figure 17:
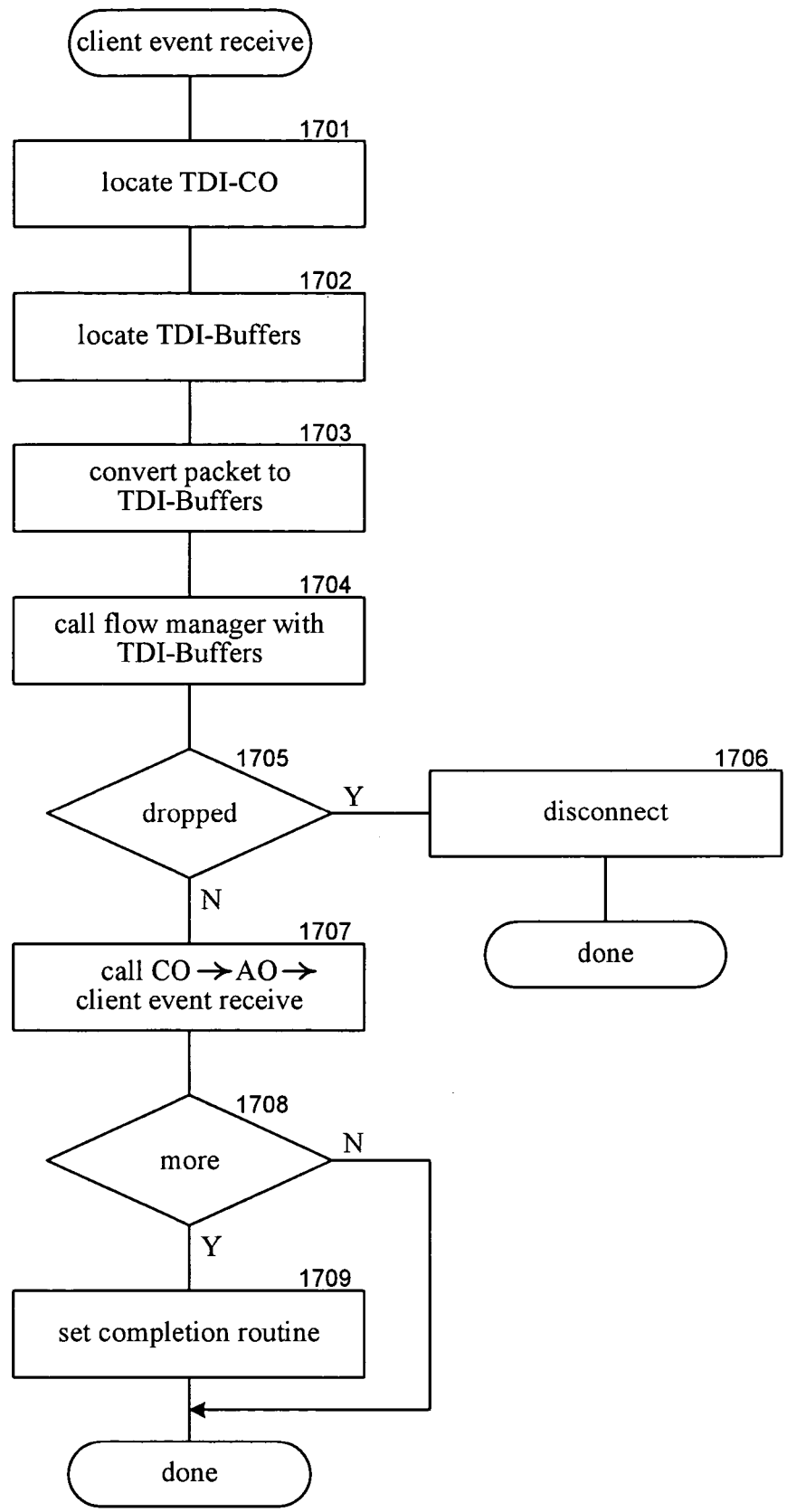
FIG. 17 is a flow diagram that illustrates processing of a receive event notification in one embodiment.

FIG. 17 is a flow diagram that illustrates processing of a receive event notification in one embodiment. This processing is performed when the TDI provider invokes an event handler (or callback) of the interceptor system. In block 1701, the component locates the TDI connection object data structure identified by the context provided by the TDI provider. In block 1702, the component locates the corresponding TDI buffers. In block 1703, the component converts the data of the callback to a TDI buffer data structure. In block 1704, the component calls the flow manager with the TDI buffers. In decision block 1705, if the flow manager has indicated to drop the connection, then the component disconnects the connection in block 1706 and then completes, else the component continues at block 1707. In block 1707, the component invokes the associated callback of the TDI client as indicated by the TDI address object associated with the TDI connection object. In decision block 1708, if more processing is to be performed, then the component sets the completion routine in block 1709. The component then completes.

From the foregoing, it will be appreciated that specific embodiments of the interceptor system have been described herein for purposes of illustration, but that various modifications may be made without deviating from the spirit and scope of the invention. One skilled in the art will appreciate that the interceptor component may provide additional functionality to the intercepting and buffering of communications. For example, the interceptor component may filter out repeated packets and ensure that the packets provided to the processing component are consecutive. One skilled in the art will also appreciate that various transport layer protocols and versions may be used such as TCP, UDP, IP/v4, and IP/v6. One skilled in the art will appreciate that, in addition to allowing or denying an interaction, the interceptor system may suspend operations on a particular address object or connection object until some condition is satisfied. When the condition is satisfied, the interceptor system can reinvoke the suspended operation so that it can be completed. Accordingly, the invention is not limited except as by the appended claims.

We claim:

1. A method in a computer system for intercepting communications between a transport client and a transport provider, the method comprising:
   launching an interceptor component before launching the transport provider wherein the interceptor component requests to be notified when the transport provider is launched;
   launching the transport provider wherein the interceptor component is notified of the launch;
   under control of the interceptor component,
      upon being notified that the transport provider has been launched, registering to intercept calls by the transport client to functions of the transport provider;
      after the interceptor component has registered to intercept calls to the transport provider, launching the transport client;
      when a call by the transport client is intercepted by the interceptor component,
         when the intercepted call is to register a callback with the transport provider, replacing the callback to intercept calls from that transport provider to the transport client;
         providing an indication of the call to a processing component;
         receiving an indication from the processing component of how to handle the call; and
         processing the call in accordance with the received indication; and
      when a callback by the transport provider is intercepted by the interceptor component,
         providing an indication of the callback to a processing component;
         receiving an indication from the processing component of how to handle the callback; and
         processing the callback in accordance with the received indication.

2. The method of claim 1 wherein the transport client and transport provider communicate via the Transport Device Interface.

3. The method of claim 1 wherein the replacing of callbacks includes when an intercepted call from the transport client to the transport provider is to register a callback of the transport client with the transport provider, storing an indication of the callback and registering an intercepting callback with the transport provider so that a callback from the transport provider to the transport client can be intercepted.

4. The method of claim 1 wherein the processing component implements a security policy.

5. The method of claim 1 wherein the indication of how to handle the call indicates to allow or deny the call.

6. The method of claim 1 including buffering data of multiple calls and providing the buffered data to the processing component.

7. The method of claim 1 including replacing indications of completion routines of the transport client to intercept calls by the transport provider to the completion routines.

8. A system with a processor and memory for intercepting communications between a transport client and a transport provider, comprising components stored in memory for execution by the processor, the components comprising:
   a component that registers to intercept calls by the transport client to the transport provider;
   a component that replaces callbacks of the transport client to intercept calls by the transport provider to the transport client;
   a component that replaces completion routines of the transport client to intercept calls by the transport provider to the transport client; and
   a component that upon intercepting a call provides an indication of the call to a processing component and forwards the intercepted call.

9. The system of claim 8 wherein the processing component indicates whether to allow or deny the call and wherein the call is not forwarded when the indication is to deny.

10. The system of claim 8 wherein the transport client and transport provider communicate via the Transport Device Interface.

11. The system of claim 8 wherein the component that replaces callbacks, when an intercepted call from the transport client to the transport provider is to register a callback of the transport client with the transport provider, stores an indication of the callback and registers an intercepting callback with the transport provider so that a callback from the transport provider to the transport client can be intercepted.

12. The system of claim 8 wherein the processing component implements a security policy.

13. The system of claim 8 wherein the component that registers to intercept calls registers before the transport client starts communicating with the transport provider.

14. The system of claim 8 including a component that buffers data of multiple intercepted calls and provides the buffered data to the processing component.

15. A computer-readable storage medium containing instructions for controlling a computer system to intercept calls between a transport client and a transport provider, by a method comprising:
   registering to intercept calls by the transport client to the transport provider;
   intercepting a call by the transport client to register a callback with the transport provider and replacing the callback with an intercepting callback so that the transport provider calls to the intercepting callback;
   intercepting a call by the transport client and replacing a completion routine of the transport client with an intercepting completion routine to intercept calls by the transport provider to a completion routine; and
   intercepting a call, notifying a processing component of the intercepted call, and forwarding the intercepted call.

16. The computer-readable storage medium of claim 15 wherein the processing component indicates whether to allow or deny a call and wherein the call is not forwarded when the indication is to deny.

17. The computer-readable storage medium of claim 16 wherein the transport client and transport provider communicate via the Transport Device Interface.

18. The computer-readable storage medium of claim 15 wherein the processing component implements a security policy.

19. The computer-readable storage medium of claim 15 wherein the registering to intercept calls is before the transport client starts calling the transport provider.

* * * * *